United States Patent
Kulkarni et al.

(10) Patent No.: US 10,419,606 B2
(45) Date of Patent: Sep. 17, 2019

(54) CALL RECORDING TEST SUITE

(71) Applicant: Cyara Solutions Pty Ltd, Melbourne, Victoria (AU)

(72) Inventors: Alok Kulkarni, Glen Iris (AU); Luan Tran, Avondale Heights (AU)

(73) Assignee: Cyara Solutions Pty Ltd, Hawthorn, VIC (AU)

( * ) Notice: Subject to any disclaimer, the term of this patent is extended or adjusted under 35 U.S.C. 154(b) by 0 days.

(21) Appl. No.: 14/848,849

(22) Filed: Sep. 9, 2015

(65) Prior Publication Data

US 2016/0072945 A1    Mar. 10, 2016

Related U.S. Application Data

(60) Provisional application No. 62/048,108, filed on Sep. 9, 2014.

(51) Int. Cl.
- H04M 3/42 (2006.01)
- H04M 3/28 (2006.01)
- G10L 13/04 (2013.01)

(52) U.S. Cl.
CPC ......... H04M 3/42221 (2013.01); H04M 3/28 (2013.01); *G10L 13/04* (2013.01)

(58) Field of Classification Search
CPC ...... H04M 3/2263; H04M 3/28; H04M 3/242; H04M 3/5175; H04M 2203/355; H04M 3/323; H04M 3/42221; H04M 2201/40; H04L 51/02; H04L 51/046; G10L 13/04
See application file for complete search history.

(56) References Cited

U.S. PATENT DOCUMENTS

| | | | |
|---|---|---|---|
| 5,490,204 A * | 2/1996 | Gulledge | H04W 24/00 455/423 |
| 6,252,946 B1 * | 6/2001 | Glowny | H04M 3/36 379/111 |
| 6,535,908 B1 | 3/2003 | Johnson et al. | |
| 7,388,946 B1 * | 6/2008 | Mussman | H04L 41/5003 370/252 |
| 7,680,250 B1 | 3/2010 | Zilles et al. | |
| 8,019,063 B2 * | 9/2011 | Gallant | H04M 3/42374 379/112.01 |
| 8,737,571 B1 * | 5/2014 | Seeley | H04M 3/28 379/1.03 |
| 8,787,552 B1 * | 7/2014 | Zhao | H04M 3/5175 379/265.05 |
| 9,336,409 B2 * | 5/2016 | Doren | G10L 21/00 |
| 9,369,570 B1 * | 6/2016 | Kolodizner | H04M 3/2236 |
| 10,212,283 B1 * | 2/2019 | Gao | H04M 3/28 |
| 2002/0006186 A1 * | 1/2002 | Sanders | H04M 1/24 379/1.01 |

(Continued)

*Primary Examiner* — Lisa Hashem
(74) *Attorney, Agent, or Firm* — Brian R. Galvin; Brian S. Boon; Galvin Patent Law, LLC

(57) ABSTRACT

A call recording test suite comprising a call recording test manager stored and operating on a network-connected computing device and a test database, wherein the call recording test manager connects over a network to a call recording system and verifies the existence of an expected call recording and stores the results of the query in the database, and a method for call recording testing for a specific call recording, and a method for call recording testing using a synthetic test call.

1 Claim, 7 Drawing Sheets

(56) References Cited

U.S. PATENT DOCUMENTS

| | | | |
|---|---|---|---|
| 2002/0077819 A1* | 6/2002 | Girardo | G10L 25/69 704/260 |
| 2003/0212561 A1* | 11/2003 | Williams | H04M 3/24 704/270.1 |
| 2004/0008825 A1* | 1/2004 | Seeley | H04M 3/22 379/32.01 |
| 2005/0119992 A1* | 6/2005 | Martino | G06F 17/243 |
| 2006/0271366 A1 | 5/2006 | Bruckman | |
| 2006/0117222 A1* | 6/2006 | Shen | G06F 8/31 714/38.14 |
| 2007/0271103 A1* | 11/2007 | Natesan | H04M 3/4938 704/270.1 |
| 2008/0304632 A1* | 12/2008 | Catlin | H04M 3/4938 379/88.04 |
| 2008/0304650 A1* | 12/2008 | Catlin | H04M 3/24 379/298 |
| 2009/0041214 A1* | 2/2009 | Hengel | H04M 3/42221 379/88.17 |
| 2009/0150409 A1* | 6/2009 | Watson | H04N 5/76 |
| 2010/0034362 A1* | 2/2010 | Phelps | H04M 3/42221 379/88.19 |
| 2010/0130136 A1* | 5/2010 | Sepehri-Nik | G06Q 30/02 455/67.11 |
| 2011/0107147 A1* | 5/2011 | Kesireddy | G06F 11/2294 714/33 |
| 2011/0150189 A1* | 6/2011 | Kulkarni | H04M 3/323 379/32.01 |
| 2011/0254961 A1* | 10/2011 | Putnam | H04L 43/08 348/180 |
| 2012/0039448 A1* | 2/2012 | Poi | H04M 3/24 379/26.01 |
| 2012/0087486 A1* | 4/2012 | Guerrero | H04M 3/5175 379/265.02 |
| 2013/0290932 A1* | 10/2013 | Kruglick | G06F 11/3676 717/124 |
| 2014/0108583 A1* | 4/2014 | Kulkarni | H04L 51/046 709/206 |
| 2014/0270118 A1* | 9/2014 | Kolodizner | H04M 3/53 379/88.17 |
| 2015/0201067 A1* | 7/2015 | Chen | H04M 3/2218 379/45 |
| 2015/0304829 A1* | 10/2015 | Zehavi | H04W 4/16 370/219 |
| 2015/0365520 A1* | 12/2015 | Bennett | H04M 3/2281 455/417 |
| 2016/0057282 A1* | 2/2016 | Kulkarni | G10L 17/00 379/265.04 |
| 2016/0198045 A1* | 7/2016 | Kulkarni | H04W 4/16 370/219 |
| 2016/0300565 A1* | 10/2016 | Arrowood | G10L 15/08 |
| 2017/0257482 A1* | 9/2017 | Chapman | H04M 3/28 |
| 2017/0264575 A1* | 9/2017 | Willshire | H04L 41/5038 |
| 2017/0272575 A1* | 9/2017 | Ouimette | H04M 3/5175 |
| 2019/0007550 A1* | 1/2019 | Kulkarni | H04M 3/5175 |

\* cited by examiner

CALL RECORDING TEST SUITE

CROSS-REFERENCE TO RELATED APPLICATIONS

The present application claims the priority of, and benefit to, U.S. provisional patent application Ser. No. 62/048,108, titled "CALL RECORDING TEST SUITE" and filed on Sep. 9, 2014, the entire specification of which is herein incorporated in its entirety.

BACKGROUND OF THE INVENTION

Field of the Art

The disclosure relates to the field of contact center operations, and more particularly to the field of call recording and review for PCI compliance auditing.

Discussion of the State of the Art

In the field of contact center operations, centers are required by law to comply with certain regulations regarding proprietary customer information (PCI). For example, calls into the center must be recorded, and these recordings stored such that they may be provided when required, such as by a subpoena or court order. Additionally, even after recording certain requirements must be met, for example in banking or financial institutions regarding the storage of customer financial information (such as credit card or account numbers). When a recording is not found upon request, the contact center may be subjected to a fine or other penalties.

Metadata may be used in the art to "tag" calls and recording to make retrieval easier. For example, an agent might mark a call as "important", indicating that it needs to be retained (such as for calls dealing with legal matters, for example), as well as other possible metadata associations to identify features or attributes of a call (such as a topic, participant info, time-based information, or other such details that might be considered relevant for storage or retrieval of a call recording).

A problem exists, wherein a customer (such as an individual or a corporate entity) attempts to retrieve call recordings and they cannot be found. This may be due to inadequate metadata association, poor recording compliance, or any number of technical or personnel issues that could affect the integrity of the call recording process or the recordings themselves. Systems often are not fully load-tested to ensure reliable function, and as new versions of the recording software are deployed they often have new issues that have not been identified or worked out prior to deployment.

What is needed to answer the need for reliable call recording and retrieval, is a system and method for testing call recording and ensuring PCI compliance, that may be used to verify call recordings as well as test a recording system either prior to full deployment in a production setting, or in place (that is, after deployment) as needed.

SUMMARY OF THE INVENTION

Accordingly, the inventor has conceived and reduced to practice, in a preferred embodiment of the invention, a call recording test suite for PCI compliance, that may be used to test call recording systems in-place or prior to deployment, and that may be used without impacting live performance of a system already deployed.

According to a preferred embodiment of the invention, a test suite comprising a call recording test manager stored and operating on a network-connected computing device (such as, for example, a computer server or workstation), and a testing database (that may be any suitable data storage medium such as hardware or software-based storage means), is disclosed. According to the embodiment, the call recording test manager may communicate via the Internet or other suitable data communication network, such as to connect with various call recording systems known in the art that may be operated by network-connected client systems such as contact centers. Such systems may include (but are not limited to) an automated call distributor (ACD) that may generally receive and distribute incoming calls, and that may utilize a call recorder to record calls for storage in a call recording database (CRDB), or a media server that may be operated by a contact center for such purposes as to receive various data communications such as e-mail, IP-based chat interactions, or other such interactions, and that may utilize a call recorder for such purposes as to record a copy of received interactions for storage in a CRDB. It should be appreciated that the systems described are exemplary, and that a variety of possible systems may be utilized according to the invention, such as alternate forms of call or media servers, for example alternate systems such as an e-mail server, chat server, web server, or any other suitable interaction component that may receive user interactions for recording.

Further according to the embodiment, connections across networks may be possible such as from a data communication network such as the Internet, to a public switched telephone network (PSTN), for example to interact with telephony-based systems such as a hosted ACD, as are commonly utilized in distributed or cloud-based contact center applications in the art, or a hosted call recorder that may be operated by a call recording service such as for providing call recording functionality in a cloud-based or software as a service (SaaS) arrangement to third parties, and that may record calls or interactions for storage in a hosted CRDB. In this manner, it can be appreciated that the call recording test manager of the invention may be useful in a variety of local, remote, or cloud-based arrangements, without need for a particular system, arrangement, or network.

According to the embodiment, a call recording test suite may further comprise additional systems for use with a call recording test manager, such as a synthetic call generator that may be a software or hardware component that may be utilized to place synthetic calls or interactions to connected call recording systems, for example to test their functionality using specially-crafted interactions designed to examine specific functionalities or use cases. A synthetic call generator may further utilize a text-to-speech (TTS) engine for such purposes as to generate audible interaction prompts from text-based input, for example such that a configuration file in text form may be loaded and used to generate a synthetic test call, as well as an automated speech recognition (ASR) engine that may receive audible interaction and translate it into text-based output suitable for storage or computer-based interpretation. Such speech conversion functions may be used in the execution of test calls, which may then be executed as an audio interaction similar to a traditional telephone call for purposes of interaction with telephony-based systems such as an ACD. An audio quality tester may also be utilized, such as to analyze the quality of the audio recording itself during testing, expanding the utility of the test suite to cover not only testing the operation of a call recording system or whether a recording was made and can be retrieved, but also the quality and therefore usefulness of the recordings themselves. Additionally, a database may be utilized by the test suite such as to store the results of test operations or configuration files such as text-based call scripts for use by a TTS engine as described previously.

It should be appreciated that a variety of additional or alternate systems or services may be utilized according to the invention, and as appropriate for a particular arrangement, and the specific systems and communication interactions illustrated are merely exemplary as a means of demonstrating the utility offered by the test suite of the invention as described herein. For example, the test suite of the invention may be utilized with a variety of call recording or interaction systems according to the specific arrangement of a contact center, for example interacting with contact center agents (either regular agents that take customer calls, or optionally a specific group that only interacts with the testing system to perform test operations), or with automated or semi-automated audio listeners or interaction systems, such that synthetic calls may be handled without occupying actual agents that may be better employed in taking live calls from customers. Additionally, interaction may occur entirely within software communication, for example via a software application programming interface (API) that may be operated by a contact center to enable integration of their call recording systems with other services (in this case, the call recording test suite of the invention), such that no actual calls occur and the software components may interact directly with each other to simulate what "would happen" if actual calls were used.

According to another preferred embodiment of the invention, a method for call recording testing utilizing a synthetic test call is disclosed. In an initial step, a call recording test manager may connect via a network to a call recording system such as might be operated by a contact center (for example), for example by placing a telephone call to the contact center such that the interaction may be handled as if it were a live interaction (such as with a customer calling in). In an next step, a synthetic call may be constructed by a synthetic call generator, optionally by loading a stored configuration from a database. In a next step, a TTS engine may be used to produce audible interaction, for example to navigate an interactive voice response (IVR) system or to interact with a contact center agent. In an optional substep, the TTS engine may identify the call as a synthetic test call, for example by notifying a contact center agent or automated call recording system that this call is being used for testing. In another optional substep, the call recording test manager may direct the metadata of the call, for example by specifically inserting keywords or phrases, or by selecting specific topics or other inputs, in order to control the manner in which the call may be tagged or recorded. For example, in a test specifically examining the recording of customer account inquiries, the test manager may choose to specify various account-specific queries or keywords, in order to predictably influence the metadata that may be associated with the call recording.

According to another preferred embodiment of the invention, a method for performing call recording testing for a specific call recording, is disclosed. In an initial step a call recording test manager may connect to a call recording system after a call (either real or synthetic) was placed and (presumably) recorded. At this point, according to the specific substeps that may have been utilized such as during a test call (if performed, as described previously), it may be known when the call was placed, what was "said" (that is, what specific synthetic call dialog was utilized), whether a transaction took place or was completed, and what metadata should be associated with the call. Therefore, in a next step, the test manager may query a recording system to attempt to locate the specific recording for the call, verifying whether a recording was taken and stored properly. In a next substep, the call recording test manager may optionally examine the recording itself, such as to determine whether it is PCI-compliant (for example, if the call was regarding a financial transaction), or if it is properly tagged according to the metadata that may be expected. In a next optional substep, the test manager may provide the recording to an audio quality tester, such as to analyze the recording and determine the quality of the recorded audio (for example, to ensure that it will be intelligible to a human analyst if necessary, or to ensure that specific details have been appropriately censored such as credit card or social security numbers), for example by comparing the received audio against a known transcript of a synthetic call and ensuring that the translation is consistent and key areas are censored as appropriate.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

DETAILED DESCRIPTION

Figure 1:
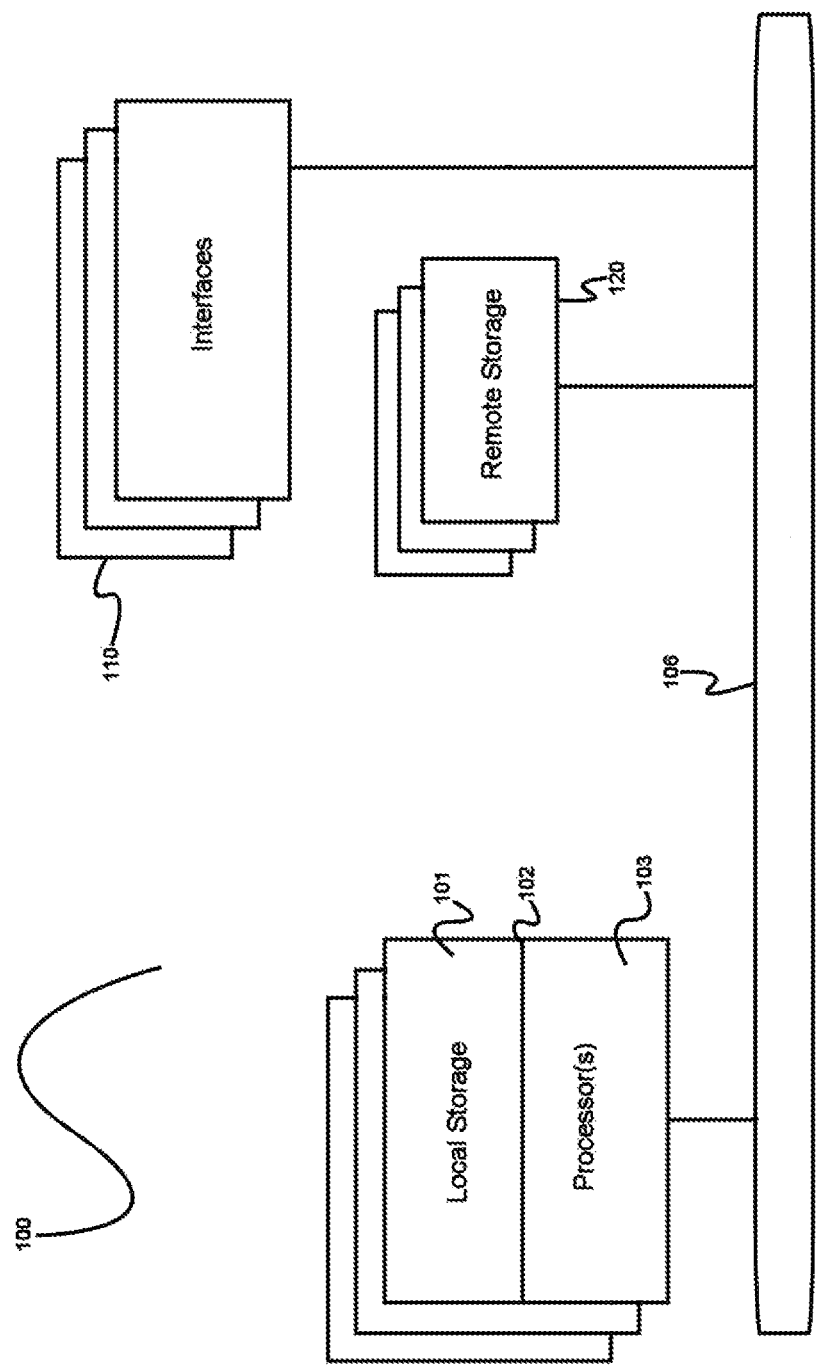
FIG. 1 is a block diagram illustrating an exemplary hardware architecture of a computing device used in an embodiment of the invention.

The inventor has conceived, and reduced to practice, in a preferred embodiment of the invention, a call recording test suite for PCI compliance, that may be used to test call recording systems in-place or prior to deployment, and that may be used without impacting live performance of a system already deployed.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like. It should be further appreciated that CPU 102 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
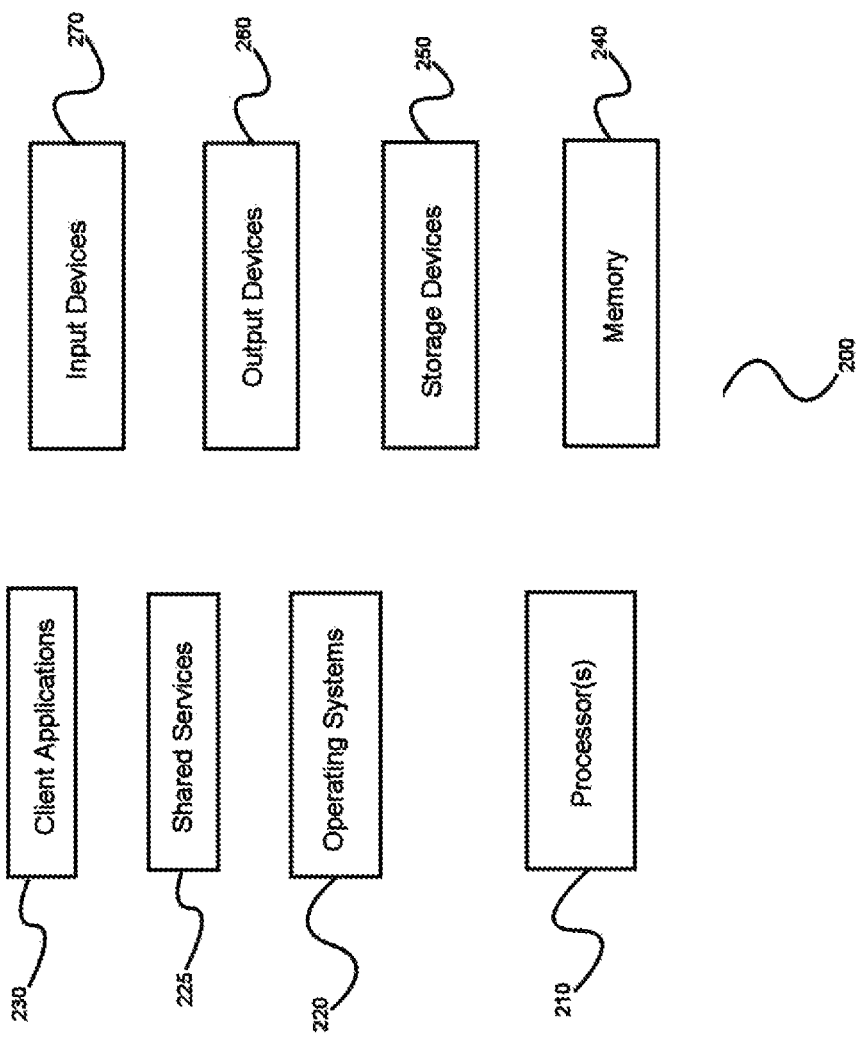
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 225 may be operable in system 200, and may be useful for providing common services to client applications 230. Services 225 may for example be WINDOWS™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form (such as those described above, referring to FIG. 1). Examples of storage devices 250 include flash memory, magnetic hard drive, CD-ROM, and/or the like.

Figure 3:
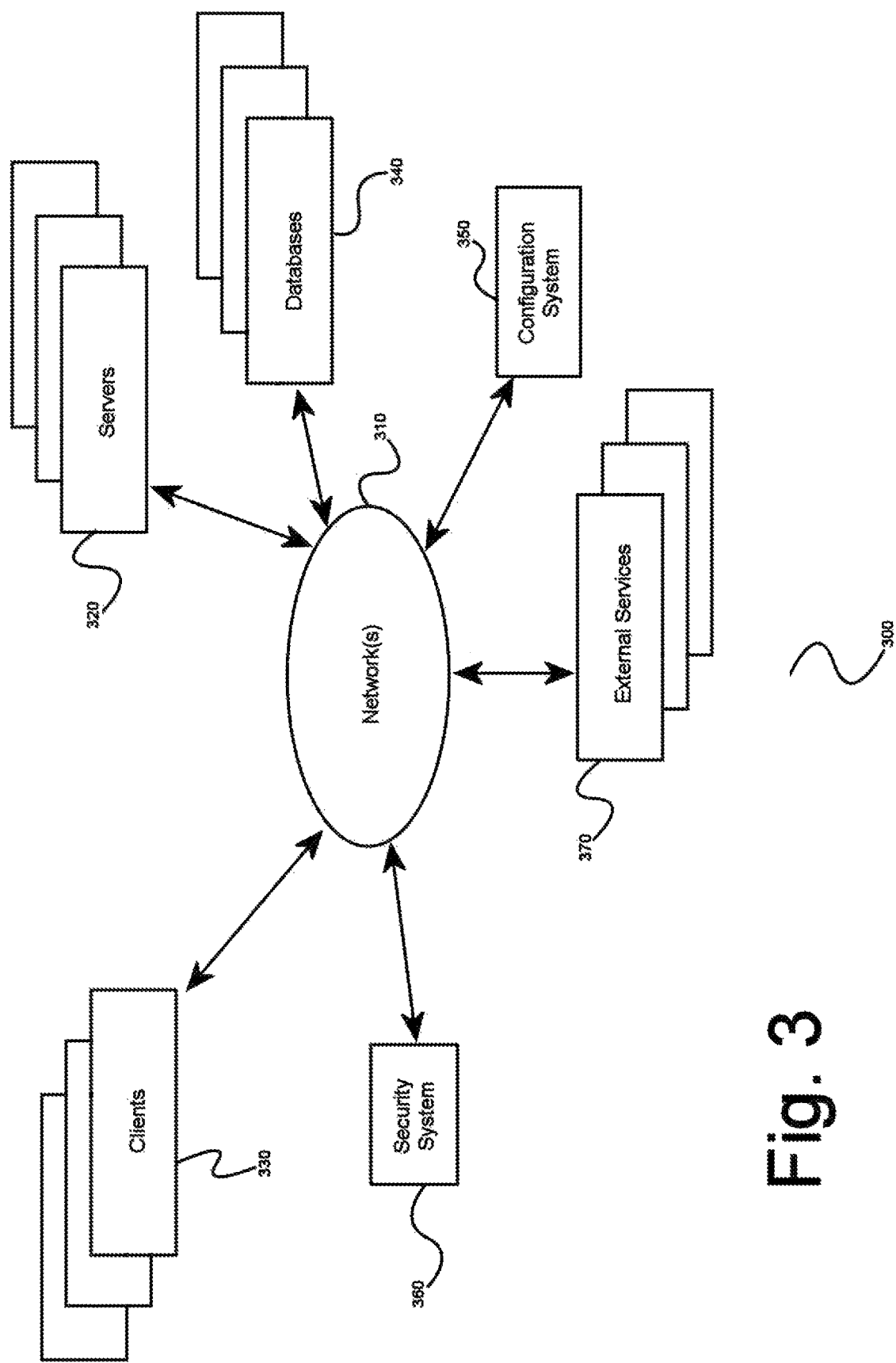
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture 300 for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network (such as CDMA or GSM cellular networks), a wireless network (such as WiFi, Wimax, LTE, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration system 350 or approach is specifically required by the description of any specific embodiment.

Figure 4:
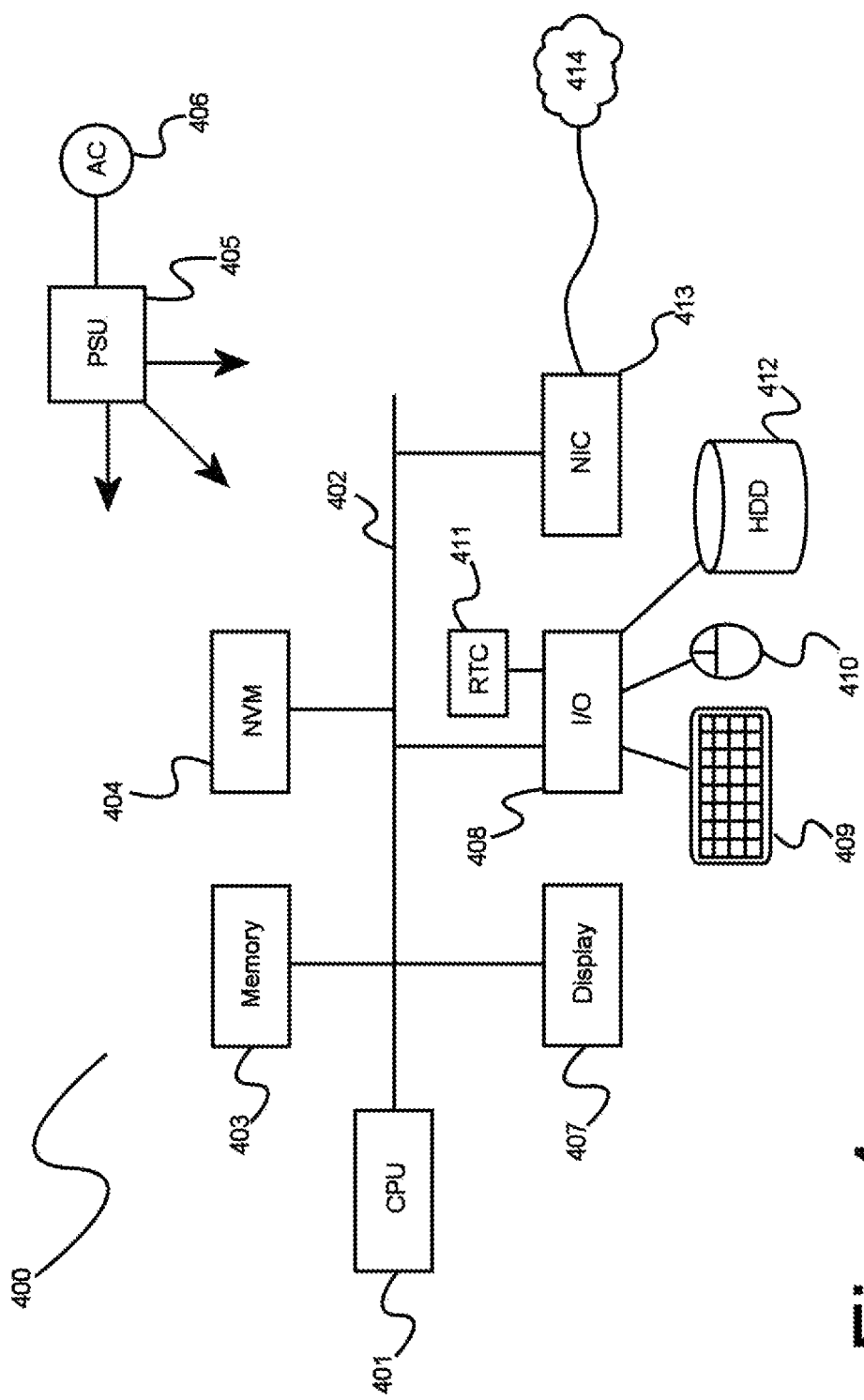
FIG. 4 is another block diagram illustrating an exemplary hardware architecture of a computing device used in various embodiments of the invention.

FIG. 4 shows an exemplary overview of a computer system 400 as may be used in any of the various locations throughout the system. It is exemplary of any computer that may execute code to process data. Various modifications and changes may be made to computer system 400 without departing from the broader scope of the system and method disclosed herein. CPU 401 is connected to bus 402, to which bus is also connected memory 403, nonvolatile memory 404, display 407, I/O unit 408, and network interface card (NIC) 413. I/O unit 408 may, typically, be connected to keyboard 409, pointing device 410, hard disk 412, and real-time clock 411. NIC 413 connects to network 414, which may be the Internet or a local network, which local network may or may not have connections to the Internet. Also shown as part of system 400 is power supply unit 405 connected, in this example, to ac supply 406. Not shown are batteries that could be present, and many other devices and modifications that are well known but are not applicable to the specific novel functions of the current system and method disclosed herein. It should be appreciated that some or all components illustrated may be combined, such as in various integrated applications (for example, Qualcomm or Samsung SOC-based devices), or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

Figure 5:
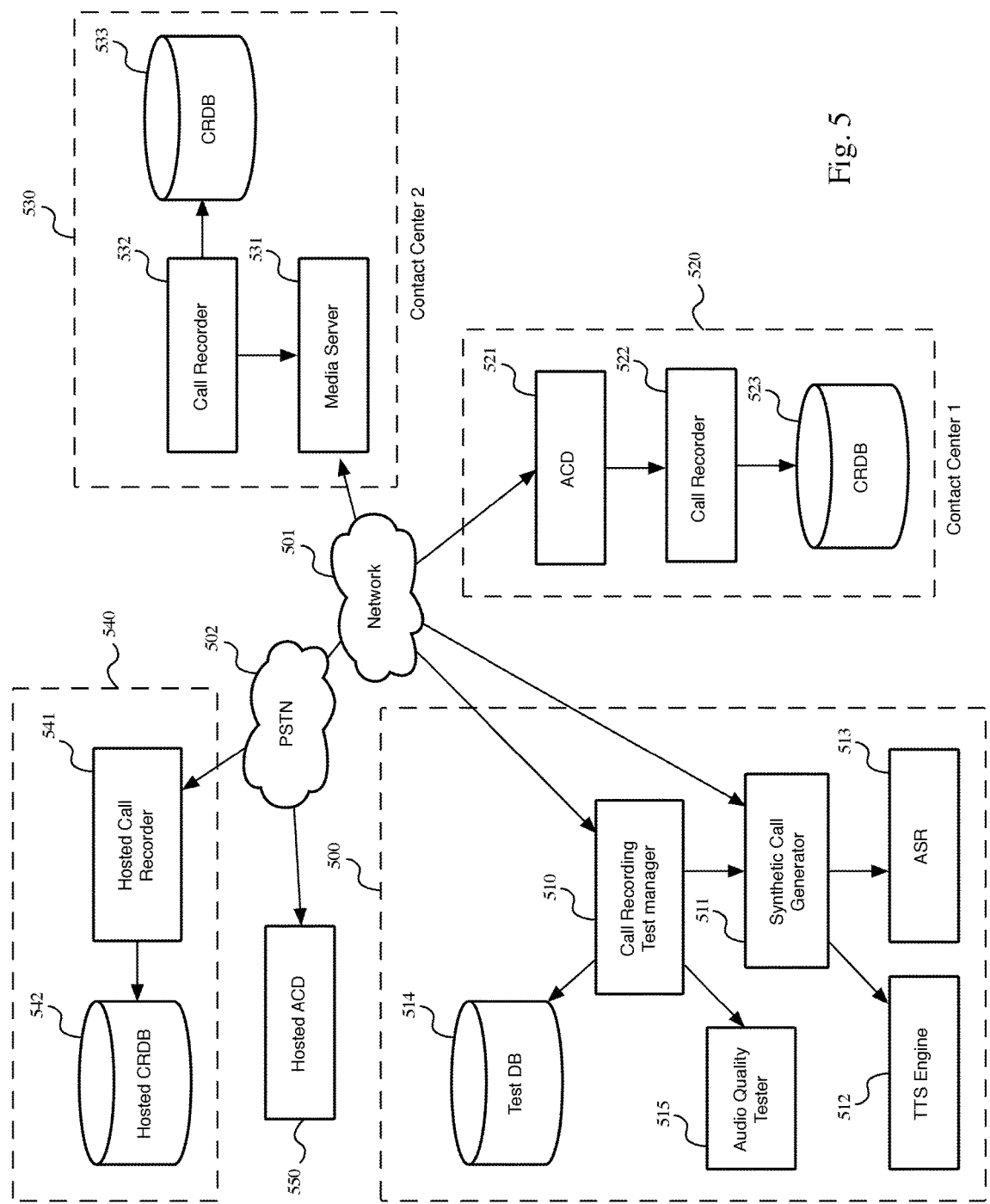
FIG. 5 is a block diagram illustrating an exemplary system architecture for performing call recording testing, according to a preferred embodiment of the invention.

FIG. 5 is a block diagram illustrating an exemplary system architecture for a call recording test suite 500, according to a preferred embodiment of the invention. According to the embodiment, a test suite 500 may comprise a call recording test manager 510 stored and operating on a network-connected computing device (such as, for example, a computer server or workstation), that may communicate via the Internet or other suitable data communication network 501, such as to connect with various call recording systems known in the art that may be operated by network-connected client systems (such as contact centers 520 and 530), as illustrated. Such systems may include (but are not limited to) an automated call distributor (ACD) 521 operated by a contact center 520, that may generally receive and distribute incoming calls, and that may utilize a call recorder 522 to record calls for storage in a call recording database (CRDB) 523, or a media server 531 that may be operated by a contact center 530 and that may be used for such purposes as to receive various data communications such as e-mail, IP-based chat interactions, or other such interactions, and that may utilize a call recorder 532 for such purposes as to record a copy of received interactions for storage in a CRDB 533. It should be appreciated that the systems shown are exemplary, and that a variety of possible systems may be utilized according to the invention, such as alternate forms of call or media servers, for example alternate systems not illustrated such as an e-mail server, chat server, web server, or any other suitable interaction component that may receive user interactions for recording.

Further according to the embodiment, connections across networks may be possible such as from a data communication network 501 such as the Internet, to a public switched telephone network (PSTN) 502, for example to interact with telephony-based systems such as a hosted ACD 550, as are commonly utilized in distributed or cloud-based contact center applications in the art, or a hosted call recorder 541 that may be operated by a call recording service 540 such as for providing call recording functionality in a cloud-based or software as a service (SaaS) arrangement to third parties, and that may record calls or interactions for storage in a hosted CRDB 542. In this manner, it can be appreciated that the call recording test manager 510 of the invention may be useful in a variety of local, remote, or cloud-based arrangements, without need for a particular system, arrangement, or network.

According to the embodiment, a call recording test suite 500 may further comprise additional systems for use with a call recording test manager 510, such as (as illustrated) a synthetic call generator 511 that may be a software or hardware component that may be utilized to place synthetic calls or interactions to connected call recording systems, for example to test their functionality using specially-crafted interactions designed to examine specific functionalities or use cases. A synthetic call generator 511 may further utilize a text-to-speech (TTS) engine 512 for such purposes as to generate audible interaction prompts from text-based input, for example such that a configuration file in text form may be loaded and used to generate a synthetic test call, as well as an automated speech recognition (ASR) engine 513 that may receive audible interaction and translate it into text-based output suitable for storage or computer-based interpretation. Such speech conversion functions may be used in the execution of test calls, which may then be executed as an audio interaction similar to a traditional telephone call for purposes of interaction with telephony-based systems such as an ACD 521. An audio quality tester 515 may also be utilized, such as to analyze the quality of the audio recording itself during testing, expanding the utility of the test suite 500 to cover not only testing the operation of a call recording system or whether a recording was made and can be retrieved, but also the quality and therefore usefulness of the recordings themselves. Additionally, a database 514 may be utilized by the test suite 500 such as to store the results of test operations or configuration files such as text-based call scripts for use by a TTS engine 512 as described previously.

It should be appreciated that a variety of additional or alternate systems or services may be utilized according to the invention, and as appropriate for a particular arrangement, and the specific systems and communication interactions illustrated are merely exemplary as a means of demonstrating the utility offered by the test suite 500 of the invention as described herein. For example, the test suite 500 of the invention may be utilized with a variety of call recording or interaction systems according to the specific arrangement of a contact center, for example interacting with contact center agents (either regular agents that take customer calls, or optionally a specific group that only interacts with the testing system to perform test operations), or with automated or semi-automated audio listeners or interaction systems, such that synthetic calls may be handled without occupying actual agents that may be better employed in taking live calls from customers. Additionally, interaction may occur entirely within software communication, for example via a software application programming interface (API) that may be operated by a contact center to enable integration of their call recording systems with other services (in this case, the call recording test suite 500 of the invention), such that no actual calls occur and the software components may interact directly with each other to simulate what "would happen" if actual calls were used.

Figure 7:
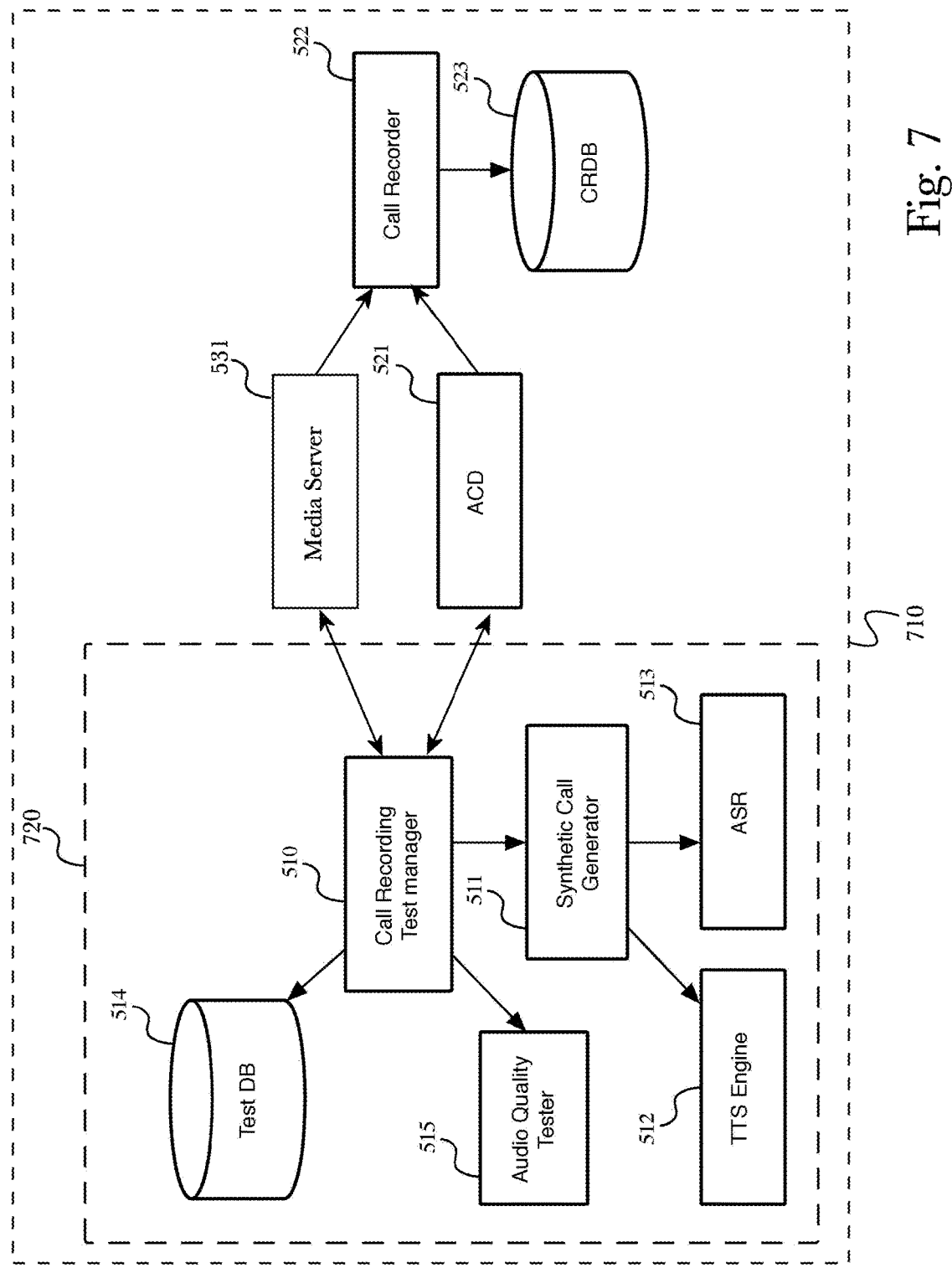
FIG. 7 is a block diagram illustrating an exemplary alternate arrangement of a system architecture for performing call recording testing, illustrating the use of an on-site test suite.

FIG. 7 is a block diagram illustrating an exemplary alternate arrangement of a system architecture 700 for performing call recording testing, illustrating the use of an on-site test suite 720 operating within a contact center 710. According to such an arrangement, a test suite 720 may comprise a call recording test manager 510 stored and operating on a computing device that may communicate with various call recording systems operated by a contact center 710. Such systems may include (but are not limited to) an automated call distributor (ACD) 521 operated by a contact center 520, that may generally receive and distribute incoming calls, and that may utilize a call recorder 522 to record calls for storage in a call recording database (CRDB) 523, or a media server 531 that may be operated by a contact center 710 and that may be used for such purposes as to receive various data communications such as e-mail, IP-based chat interactions, or other such interactions, and that may utilize a call recorder 532 for such purposes as to record a copy of received interactions for storage in a CRDB 523. It should be appreciated that the systems shown are exemplary, and that a variety of possible systems may be utilized according to the invention, such as alternate forms of call or media servers, for example alternate systems not illustrated such as an e-mail server, chat server, web server, or any other suitable interaction component that may receive user interactions for recording.

According to the embodiment, a contact center 710 may operate a testing suite 720 on-site to monitor and test user interactions during regular operations, or to perform testing of stored or historical recordings in a CRDB 523, for example to audit a store of interaction recordings. For example, a contact center may temporarily implement testing to perform a one-time audit, or to perform audits periodically. In such an on-site arrangement, testing may generally occur within a single contact center environment, without testing network-connected resources or systems as described previously (referring to FIG. 5), for example as may be useful for a small organization with only a single contact center that may wish to utilize a single testing suite on-site to defray additional costs associated with a network-based testing service or provider.

Detailed Description of Exemplary Embodiments

Figure 6:
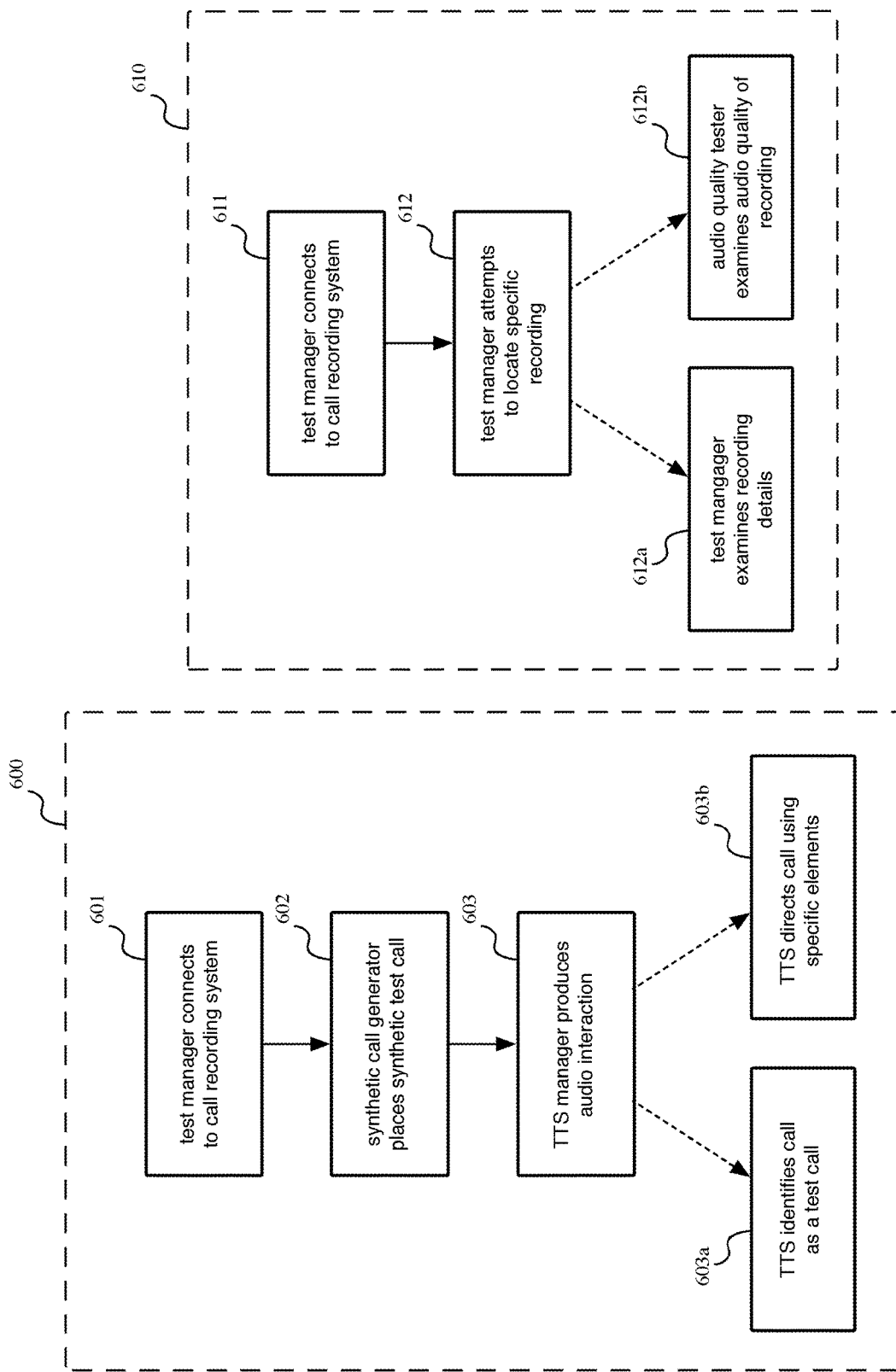
FIG. 6 is a method flow diagram, illustrating an exemplary method for call recording testing utilizing a synthetic test call, and an exemplary method for performing call recording testing for a specific call recording, according to a preferred embodiment of the invention.

FIG. 6 is a method flow diagram, illustrating an exemplary method 600 for placing a synthetic test call, and an exemplary method 610 for performing call recording testing, according to a preferred embodiment of the invention. In an initial step 601, the test manager may connect via a network to a call recording system such as might be operated by a contact center (for example), for example by placing a telephone call to the contact center such that the interaction may be handled as if it were a live interaction (such as with a customer calling in). In an next step 602, a synthetic call may be constructed by a synthetic call generator, optionally by loading a stored configuration from a database. In a next step 603, a TTS engine may be used to produce audible interaction, for example to navigate an interactive voice response (IVR) system or to interact with a contact center agent. In an optional substep 603*a*, the TTS engine may identify the call as a synthetic test call, for example by notifying a contact center agent or automated call recording system that this call is being used for testing. In another optional substep 603*b*, the call recording test manager may direct the metadata of the call, for example by specifically inserting keywords or phrases, or by selecting specific topics or other inputs, in order to control the manner in which the call may be tagged or recorded. For example, in a test specifically examining the recording of customer account inquiries, the test manager may choose to specify various account-specific queries or keywords, in order to predictably influence the metadata that may be associated with the call recording.

According to a call recording test method 610, In an initial step 611 a call recording test manager may connect to a call recording system after a call (either real or synthetic) was placed and (presumably) recorded. At this point, according to the specific substeps that may have been utilized during a test call (if performed, as described previously), it may be known when the call was placed, what was "said" (that is, what specific synthetic call dialog was utilized), whether a transaction took place or was completed, and what metadata should be associated with the call. Therefore, in a next step 612, the test manager may query a recording system to attempt to locate the specific recording for the call, verifying whether a recording was taken and stored properly. In a next substep 612*a*, the call recording test manager may optionally examine the recording itself, such as to determine whether it is PCI-compliant (for example, if the call was regarding a financial transaction), or if it is properly tagged according to the metadata that may be expected. In a next optional substep 612*b*, the test manager may provide the recording to an audio quality tester, such as to analyze the recording and determine the quality of the recorded audio (for example, to ensure that it will be intelligible to a human analyst if necessary, or to ensure that specific details have been appropriately censored such as credit card or social security numbers), for example by comparing the received audio against a known transcript of a synthetic call and ensuring that the translation is consistent and key areas are censored as appropriate.

It should be appreciated that the method described herein may be applied also to testing recordings of live calls—that is, calls produced from actual interactions in a production setting. In this manner, by optionally employing the use of a synthetic call, specially-crafted test calls may be utilized to test specific functions or features, or by omitting the synthetic call steps it is also possible to test actual calls to verify real-world operation, and it should be appreciated that such arrangements may be utilized interchangeably according to the embodiment. Additionally, it should be appreciated that the methods described herein may be employed while a call recording system is in operation, for example monitoring and testing call recordings as they take place, such as to monitor the performance of a call recording system in real-time.

The skilled person will be aware of a range of possible modifications of the various embodiments described above. Accordingly, the present invention is defined by the claims and their equivalents.

What is claimed is:

1. A contact center call recording test system, comprising:
   a contact center call recorder comprising a processor, a memory, and a plurality of programming instructions stored in the memory and operable on the processor, wherein the plurality of programming instructions, when operating on the processor, cause the processor to record phone calls placed to a contact center in a call recording database (CRDB);
a text to speech (TTS) engine that generates audible interaction prompts from text input;
an automated speech recognition (ASR) engine that converts an audio recording to text;
a synthetic call generator comprising a plurality of programming instructions stored in a memory and operating on a processor of a network-connected computing device and configured to:
  receive instructions from a call recording test manager to place a phone call to the call center;
  receive text input from the call recording test manager to be used in placing the phone call to the call center;
  generate audible interaction prompts from the text input using the TTS engine;
  place a phone call to the contact center using the instructions received from the call recording test manager and the audible interaction prompts generated by the TTS engine; and
a call recording test manager comprising a plurality of programming instructions stored in a memory and operating on a processor of a network-connected computing device, wherein the plurality of programming instructions, when operating on the processor, cause the processor to:
  instruct the synthetic call generator to place a phone call to the contact center;
  provide text input to the synthetic call generator for use in placing the phone call;
  record the start and stop times of the phone call placed by the synthetic call generator to the call center;
  request from the contact center identification information for the phone call placed by the synthetic call generator and recorded in the CRDB;
  retrieve the recording of the phone call from the CRDB using the identification information;
  confirm accuracy and quality of the recording of the phone call by:
    determining a length of the recording of the phone call and comparing the length to the start and stop times of the phone call as recorded by the call recording test manager; and
    converting the recording of the phone call to text output using the ASR engine and comparing the resulting text output to the text input provided to the synthetic call generator; and
    analyzing an audio quality of the recording by comparing it to a pre-determined audio quality standard.

* * * * *